(12) United States Patent
Sakakibara et al.

(10) Patent No.: US 8,831,922 B2
(45) Date of Patent: Sep. 9, 2014

(54) FAILURE SIGN DETECTION APPARATUS

(75) Inventors: Tadaaki Sakakibara, Kariya (JP); Hirokazu Watanabe, Obu (JP); Yoshio Nakagaki, Toyota (JP); Kenji Fukuta, Chita-gun (JP)

(73) Assignee: Denso Corporation, Kariya (JP)

( * ) Notice: Subject to any disclaimer, the term of this patent is extended or adjusted under 35 U.S.C. 154(b) by 233 days.

(21) Appl. No.: 13/095,090

(22) Filed: Apr. 27, 2011

(65) Prior Publication Data

US 2011/0264323 A1 Oct. 27, 2011

(30) Foreign Application Priority Data

Apr. 27, 2010 (JP) .................................. 2010-102185

(51) Int. Cl.
 *G05B 23/02* (2006.01)
 *G07C 5/08* (2006.01)
 *B60R 16/023* (2006.01)

(52) U.S. Cl.
 CPC ........ *B60R 16/0232* (2013.01); *G05B 23/0262* (2013.01); *G07C 5/0816* (2013.01); *G07C 5/085* (2013.01); *G05B 23/0235* (2013.01)
 USPC .................... 703/8; 703/6; 703/13; 701/29.1; 701/31.7; 701/33.6; 701/33.8; 701/34.1

(58) Field of Classification Search
 CPC ... B60C 23/061; B60T 8/885; F02D 41/0037; F02D 41/1495; F02D 41/22; F02D 41/222; F02D 2041/1433; G01G 19/086; G05B 23/0221; G05B 23/0235; G05B 23/0254; G05B 23/0283; G06F 11/3476; G07C 5/0808
 USPC ................. 701/1, 29.9, 29.1, 29.4, 29.7, 30.4, 701/30.5, 30.9, 31.1, 31.2, 31.7, 31.9, 32.1, 701/33.4, 33.6, 33.7, 33.8, 33.9, 34.1
 See application file for complete search history.

(56) References Cited

U.S. PATENT DOCUMENTS 6,435,018 B1 * 8/2002 Murakami et al. ......... 73/114.01
7,082,359 B2 * 7/2006 Breed ............................. 701/36

(Continued)

FOREIGN PATENT DOCUMENTS

| JP | 9-137717 | 5/1997 |
| JP | 2004-330892 | 11/2004 |
| JP | 2006-9589 | 1/2006 |
| JP | 2008-37194 | 2/2008 |

OTHER PUBLICATIONS

Astola et al., Fundamentals of Nonlinear Digital Filtering, CRC Press LLC, 1997.*

(Continued)

*Primary Examiner* — Kamini S Shah
*Assistant Examiner* — Michael P Healey
(74) *Attorney, Agent, or Firm* — Nixon & Vanderhye PC

(57) ABSTRACT

The failure sign detection apparatus includes an abnormality detector to make a comparison between a failure detection parameter of a vehicle device mounted on a vehicle and a predetermined abnormality detection threshold, and make a determination whether there is an abnormality in the vehicle device based on a result of the comparison, a failure sign evaluation index calculator to calculate a failure sign evaluation index for evaluating a sign of failure of the vehicle device based on an abnormality duration period over which the detected abnormality continues and a parameter threshold difference indicative of a difference between the abnormality detection threshold and the failure detection parameter, and a failure sign detector to detect a sign of failure of the vehicle device based on the failure sign evaluation index calculated by the failure sign evaluation index.

20 Claims, 15 Drawing Sheets

(56) References Cited

U.S. PATENT DOCUMENTS

| | | | |
|---|---|---|---|
| 2002/0193921 A1* | 12/2002 | Reese et al. | 701/29 |
| 2003/0139860 A1* | 7/2003 | McBrien et al. | 701/34 |
| 2008/0228421 A1* | 9/2008 | Guichard et al. | 702/89 |
| 2008/0306650 A1* | 12/2008 | Nakagaki | 701/30 |
| 2010/0161274 A1* | 6/2010 | Leao et al. | 702/179 |

OTHER PUBLICATIONS

Ceccarelli et al., Model-based Adaptive Observers for Intake Leakage Detection in Diesel Engines, 2009 American Control Conference, Hyatt Regency Riverfront, St. Louis, MO, USA, Jun. 10-12, 2009.*

* cited by examiner

FAILURE SIGN DETECTION APPARATUS

This application claims priority to Japanese Patent Application No. 2010-102185 filed on Apr. 27, 2010, the entire contents of which are hereby incorporated by reference.

BACKGROUND OF THE INVENTION

1. Field of the Invention

The present invention relates to an apparatus for detecting a sign of failure of a vehicle-mounted device.

2. Description of Related Art

It is known to make a diagnosis to detect failure of a vehicle-mounted device, and record the result of the diagnosis in a nonvolatile memory. To make such a diagnosis, it is known to make a determination that failure has occurred only after an abnormal state was detected more than once in order to prevent an erroneous determination. For example, refer to Japanese patent application Laid-open No. 2004-330892 (patent document 1). In this technique, the number of times of occurrence of an abnormal state is recorded at system off. Here, "an abnormal state" is a state in which the value of a parameter of a device is outside a normal range, and "make a determination of occurrence of failure" means to record occurrence of failure as diagnostic data after an abnormal state has continued longer than a predetermined period of time, or occurred more than a predetermined number of times.

It is also known to detect an abnormal state of an oxygen sensor based on a magnitude of the area value on the rich/lean side of its sensor value. For example, refer to Japanese patent application Laid-open No. H9-137717 (patent document 2).

Incidentally, there is a demand to enable a user of a vehicle or a mechanic to estimate a time to make a repair or replacement for each of vehicle-mounted devices, in order to assure safe driving of the vehicle and prevent reduction of fuel economy by repairing or replacing them before they fail.

In the technique disclosed in patent document 1, the number of times of occurrence of an abnormal state is counted to determine whether a device has failed or not. However, there may occur a case where the device is erroneously determined to have failed before it fails actually, for example, if the value of a parameter of the device oscillates between a normal range and an abnormal range, and accordingly the abnormal state is detected a number of times during a short period of time.

On the other hand, in the technique disclosed in patent document 2, it is possible to determine that a device is on the brink of failure based on the detected area value. However, since the information that the device is about to fail is not recorded and lost when the detection system is powered off, it is not possible to use this information in any control using the output of the oxygen sensor, or in the next fault detection.

As explained above, the technique disclosed in patent document 1 has a problem in that a device operating normally may be replaced for no reason, while the technique disclosed in patent document 2 has a problem in that a device on the brink of failure may not be repaired or replaced at an appropriate timing.

SUMMARY OF THE INVENTION

An embodiment provides a failure sign detection apparatus comprising:
an abnormality detection means to make a comparison between a failure detection parameter of a vehicle device mounted on a vehicle and a predetermined abnormality detection threshold, and make a determination whether there is an abnormality in the vehicle device based on a result of the comparison;
a failure sign evaluation index calculation means to calculate, when the abnormality detection means determines that there is an abnormality in the vehicle device, a failure sign evaluation index for evaluating a sign of failure of the vehicle device based on an abnormality duration period over which the detected abnormality continues, and a parameter threshold difference indicative of a difference between the abnormality detection threshold and the failure detection parameter;
a storage means to store the failure sign evaluation index calculated by the failure sign evaluation index calculation means; and
a failure sign detection means to detect a sign of failure of the vehicle device based on the failure sign evaluation index calculated by the failure sign evaluation index calculation means and stored in the storage means.

According to the present invention, there is provided a failure sign detection apparatus which enables repairing or replacing a vehicle-mounted device at an appropriate timing.

Other advantages and features of the invention will become apparent from the following description including the drawings and claims.

PREFERRED EMBODIMENTS OF THE INVENTION

First Embodiment

Figure 1:
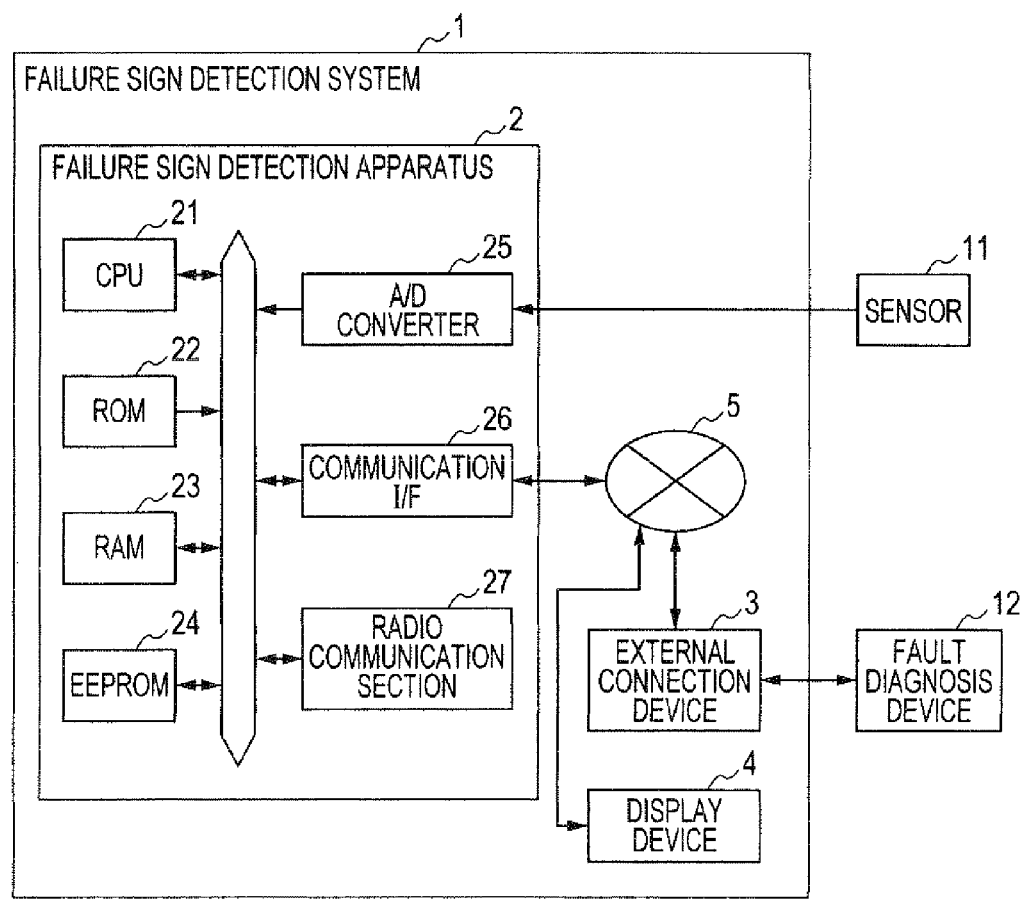
FIG. 1 is a block diagram showing the structure of a failure sign detection system 1 including a failure sign detection apparatus according to a first embodiment of the invention.

FIG. 1 is a block diagram showing the structure of a failure sign detection system 1 including a failure sign detection apparatus according to a first embodiment of the invention.

As shown in FIG. 1, the failure sign detection system 1 mounted on a vehicle is constituted of the failure sign detection apparatus 2, an external connection device 3, a display device 4 and an in-vehicle LAN 5. The failure sign detection apparatus 2 includes a CPU 21 to perform various processes in accordance with processing programs, a ROM 22 storing the processing programs, a RAM 23 to store various data, an EEPROM 24 capable of storing date therein with no power supplied, an A/D converter 25 to A/D-convert the output of a sensor 11 mounted on the vehicle, a communication interface (referred to as "I/F" hereinafter) 26 to connect the CPU 21 to the in-vehicle LAN 5, and a radio communication section 27 to exchange data with an external device outside the vehicle through wireless communication.

The external connection device 3 is connected to the in-vehicle LAN 5, so that a vehicle-use fault diagnosis device (the so-called diag tester) 12 can perform data communication with the failure sign detection apparatus 2 through the in-vehicle LAN 5.

The display device 4, which is for providing the driver and passenger of the vehicle with various information, is communicably connected to the failure sign detection apparatus 2 through the in-vehicle LAN 5. The failure sign detection apparatus 2 of the failure sign detection system 1 having the above described structure performs a failure sign determination value calculating process to calculate a failure sign determination value (to be explained later), a failure sign diagnosis result response process to make a response with a failure sign diagnosis result to the fault diagnosis device 12, and a failure sign evaluation index reset process to reset a failure sign evaluation index (to be explained later).

Figure 2:
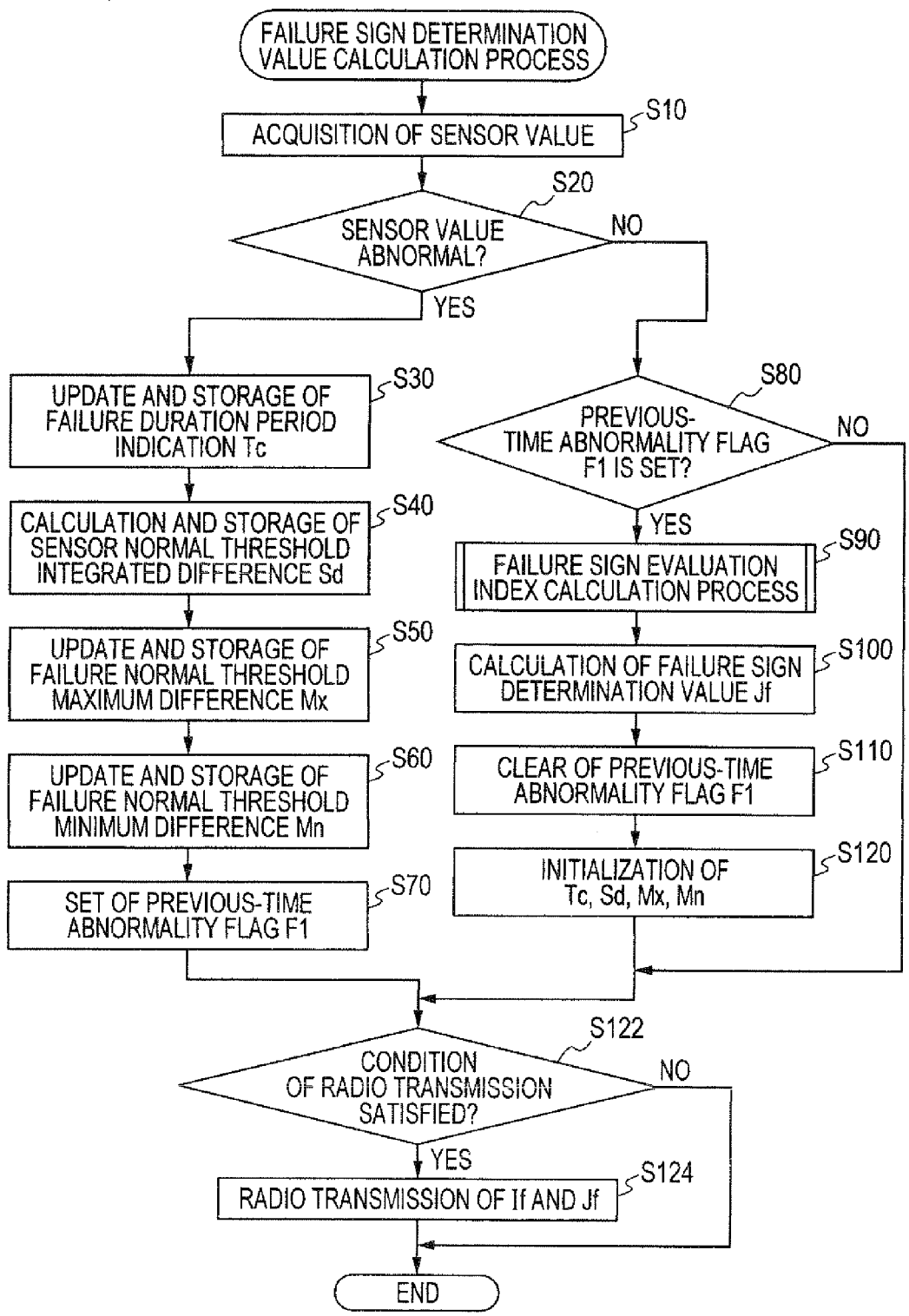
FIG. 2 is a flowchart showing a process for calculating a failure sign determination value performed in the first embodiment.

Next, the failure sign determination value calculating process performed by the failure sign detection apparatus 2 is explained with reference to the flowchart of FIG. 2. This process is performed repeatedly at certain time intervals (every 32 ms, for example) while the CPU 21 of the failure sign detection apparatus 2 is powered on.

Figure 7:
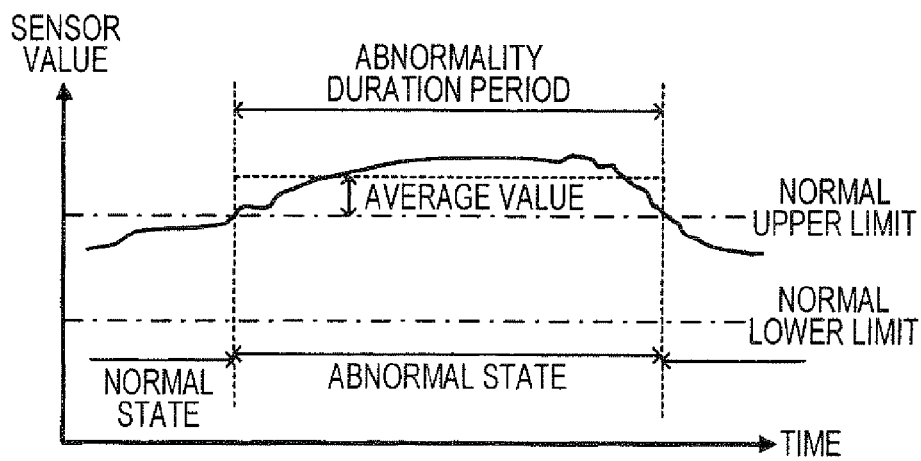
FIG. 7 is a diagram explaining a method of calculating the failure sign evaluation index.

This process begins at step S10 where the CPU 21 takes in the value indicated by the output of the sensor 11 (referred to as "sensor value" hereinafter) through the A/D converter 25. In subsequent step S20, it is determined whether or not the sensor value is abnormal. More specifically, the sensor value is determined to be normal if it is within a predetermined normal range, and otherwise determined to be abnormal. Here, the predetermined normal range is a range from a predetermined normal lower limit to a predetermined normal upper limit as shown in FIG. 7. In the following, the normal lower limit and the normal upper limit are correctively referred to as a normal threshold.

If the determination result in step S20 is affirmative, the process proceeds to step S30 to update and store an abnormality duration time. More specifically, a value equivalent to 32 ms is added to the abnormality duration time indication Tc prestored in the RAM 23.

Subsequently, an integrated value of the difference between the sensor value and the normal threshold is updated and stored in step S40. More specifically, the difference between the sensor value and the normal threshold is referred to as "sensor normal threshold difference Ds" hereinafter. That is, the difference between the sensor value and the normal upper thresh is calculated as the sensor normal threshold difference Ds if the sensor value is higher than the normal upper limit, and the difference between the sensor value and the normal lower limit is calculated as the sensor normal threshold difference Ds if the sensor value is lower than the normal lower limit. This calculated difference is added to a sensor normal threshold integrated difference Sd prestored in the RAM 23, to update this updated sensor normal threshold integrated difference Sd. That is, a value of the sensor normal threshold difference Ds integrated over the period from the time when the abnormality occurred to the present time (referred to as "abnormality duration period" hereinafter) is calculated.

In subsequent step S50, the maximum value of the sensor normal threshold difference Ds for the abnormality duration period (referred to as "sensor normal threshold maximum difference Mx" hereinafter) is updated and stored. More specifically, if the sensor normal threshold difference Ds calculated in step S40 is detected to be larger than a sensor normal threshold maximum difference Mx prestored in the ROM 23, this sensor normal threshold difference Ds is stored as the updated sensor normal threshold maximum difference Mx.

Subsequently, in step S60, the minimum value of the sensor normal threshold difference Ds for the abnormality duration period (referred to as "sensor normal threshold minimum difference Mn" hereinafter) is updated and stored. More specifically, if the sensor normal threshold difference Ds calculated in step S40 is detected to be smaller than a sensor normal threshold minimum difference Mn prestored in the ROM 23, this sensor normal threshold difference Ds is stored as the updated sensor normal threshold minimum difference Mn.

Thereafter, the process proceeds to step S70 to set a previous-time abnormality flag F1, and then proceeds to step S122. If the determination result in step S20 is negative, the process proceeds to step S80 to determine whether or not the previous-time abnormality flag F1 has been set. If the determination result in step S80 is negative, (that is, if the previous-time abnormality flag F1 has been cleared), the process proceeds to step S122.

If the determination result in step S80 is affirmative, the process proceeds to step S90 to perform a failure sign evaluation index calculation process (to be explained later) to calculate a failure sign evaluation index If (to be explained later), and then proceeds to step S100 to calculate an average of all the values of the failure sign evaluation index If calculated in step S80 and stored in the EEPROM 24 as a failure sign determination value Jf to be stored in the EEPROM 24.

Thereafter, the process proceeds to step to S110 to clear the previous-time abnormality flag F1, and then proceeds to step S120 to initialize each of the sensor normal threshold integrated difference Sd, the sensor normal threshold maximum difference Mx and the sensor normal threshold minimum difference Mn to 0.

In subsequent step S122, it is determined whether or not a predetermined radio transmission condition is satisfied. In this embodiment, this radio transmission condition is that an hour has passed from the time when the previous radio transmission was performed. If the determination result in step S122 is negative, this failure sign determination value calculating process is terminated.

If the determination result in step S122 is affirmative, the process proceeds to step S124 to radio-transmit the failure sign evaluation index If and the failure sign determination value Jf to a data center which operates to collect vehicle data, and then is terminated.

Figure 3:
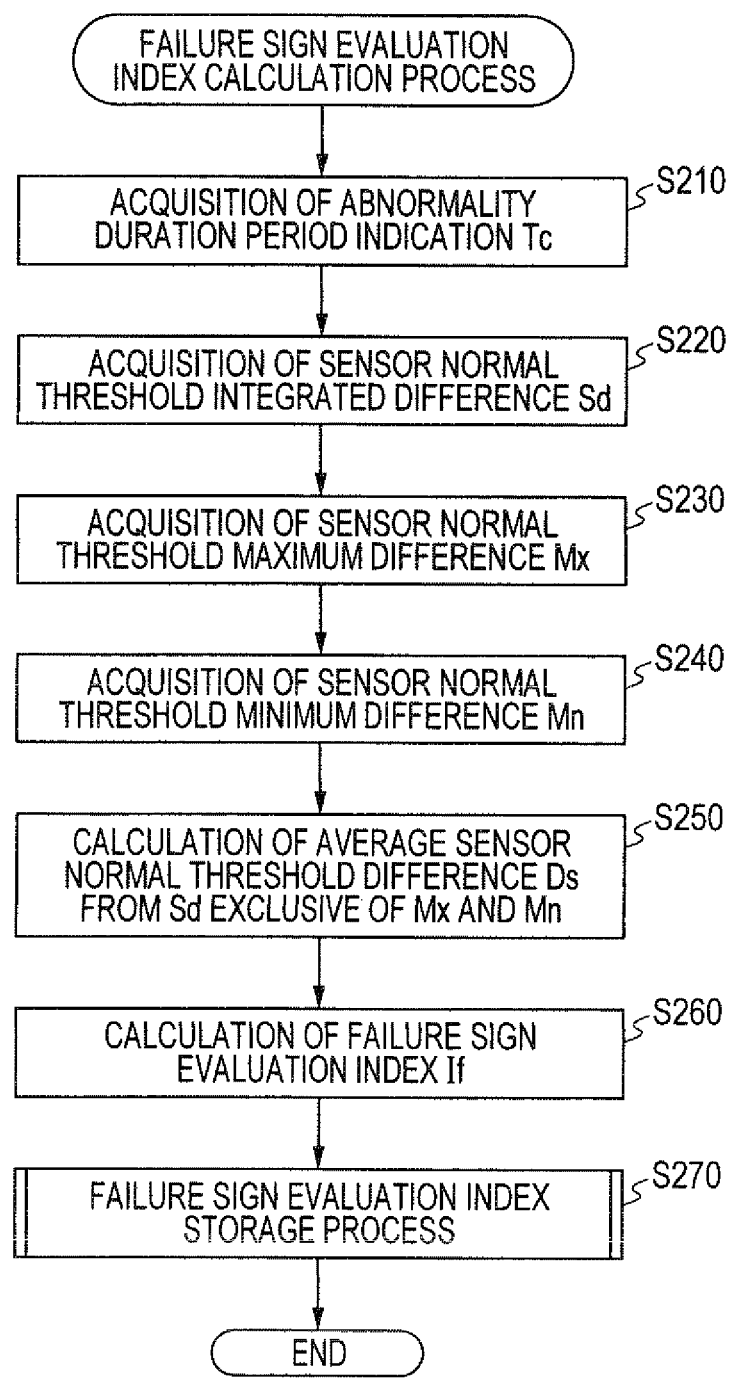
FIG. 3 is a flowchart showing a process for calculating a failure sign evaluation index performed in the first embodiment.

Next, the failure sign evaluation index calculating process is explained with reference to the flowchart of FIG. 3. This process begins at step S210 where the CPU 21 takes in the abnormality duration period indication Tc from the RAM 23. Subsequently, the CPU 21 takes in the sensor normal threshold integrated difference Sd, the sensor normal threshold maximum difference Mx and the sensor normal threshold minimum difference Mn from the RAM 23 in steps S220, S230 and S240, respectively.

Thereafter, an average of the sensor normal threshold difference Ds is calculated based on the sensor normal threshold integrated difference Sd excluding the sensor normal threshold maximum difference Mx and the sensor normal threshold minimum difference Mn is calculated in step S250. In more detail, the sensor normal threshold integrated difference Sd less the sum of the sensor normal threshold maximum difference Mx and the sensor normal threshold minimum difference Mn is divided by the number of times of integration of the sensor normal threshold difference Ds minus two (to exclude the sensor normal threshold maximum difference Mx and the sensor normal threshold minimum difference Mn).

In subsequent step S260, a product of the average of the sensor normal threshold difference Ds calculated in step S250 and the abnormality duration period indication Tc acquired in step S210 is calculated as a failure sign evaluation index If, and stored in the RAM 23.

Figure 4:
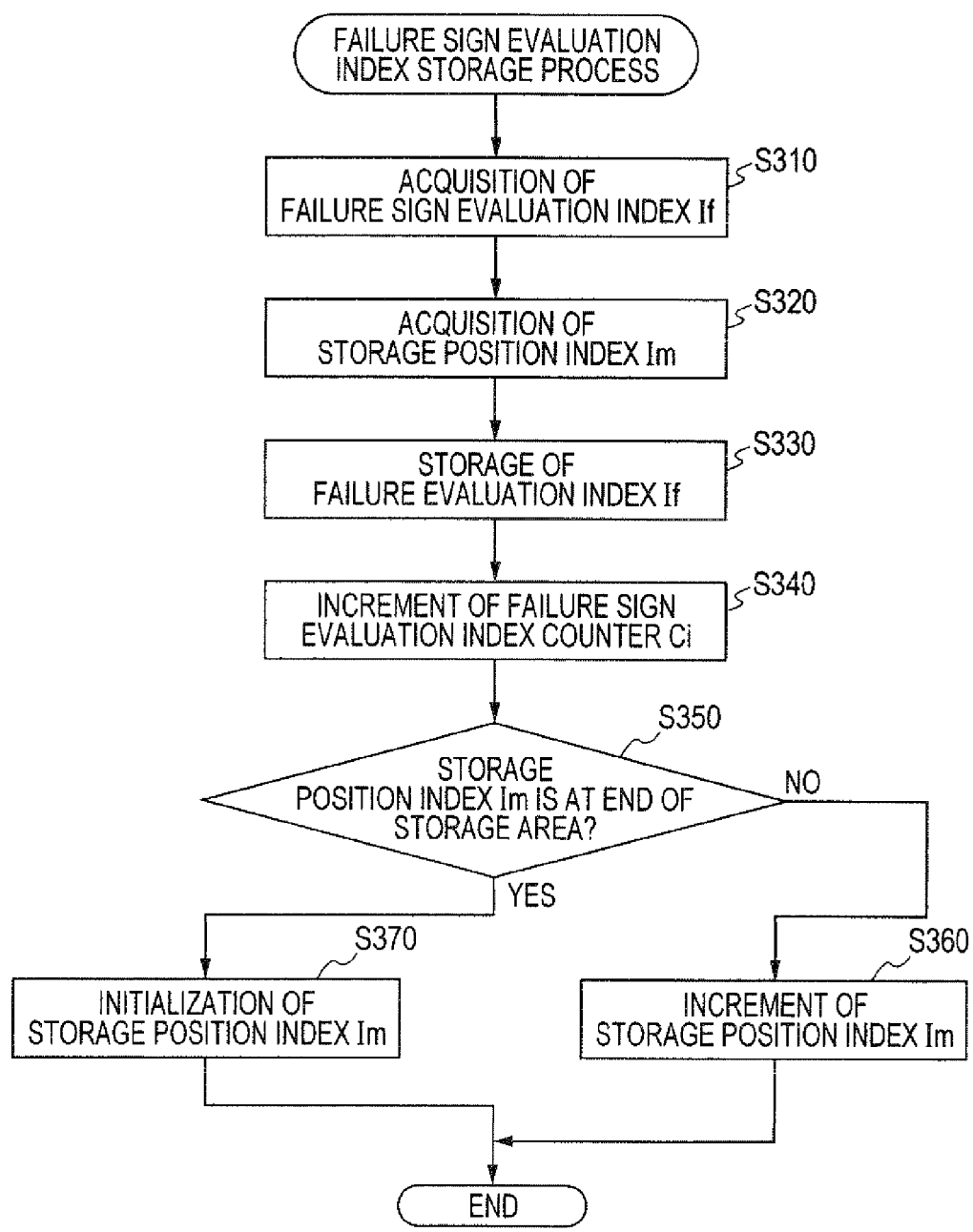
FIG. 4 is a flowchart showing a process for storing the failure sign evaluation index performed in the first embodiment.

Thereafter, the process proceeds to step S270 to perform a failure sign evaluation index storage process to store the failure sign evaluation index If calculated in step S270, and then is terminated. Next, the failure sign evaluation index storage process performed in step S270 is explained with reference to the flowchart of FIG. 4.

The failure sign evaluation index storage process begins at step S310 to acquire the failure sign evaluation index If stored in the RAM 23 in step S260. Subsequently, a storage position index Im prestored in the EEPROM 24 to indicate a position to store the failure sign evaluation index If is acquired in step S320.

Thereafter, the process proceeds to step S330 to store the failure sign evaluation index If acquired in step S320 at a position indicated by the storage position index Im acquired in step S320 while associating it with data indicative of the present time. Subsequently, a failure sign evaluation index counter Ci prestored in the EEPROM 24 to provide indication of the number of the presently stored values of the failure sign evaluation index If is incremented in step S340.

Next, it is determined whether or not the storage position indicated by the storage position index Im is the end position of the area to store the values of the failure sign evaluation index If in step S350. If the determination result in step S350 is negative, the process proceeds to step S360 to increment the storage position index Im, and then is terminated. If the determination result in step S350 is affirmative, the process proceeds to step S370 to initialize the storage position index Im so that it is set at the start position of the area to store the values of the failure sign evaluation index If.

Figure 5:
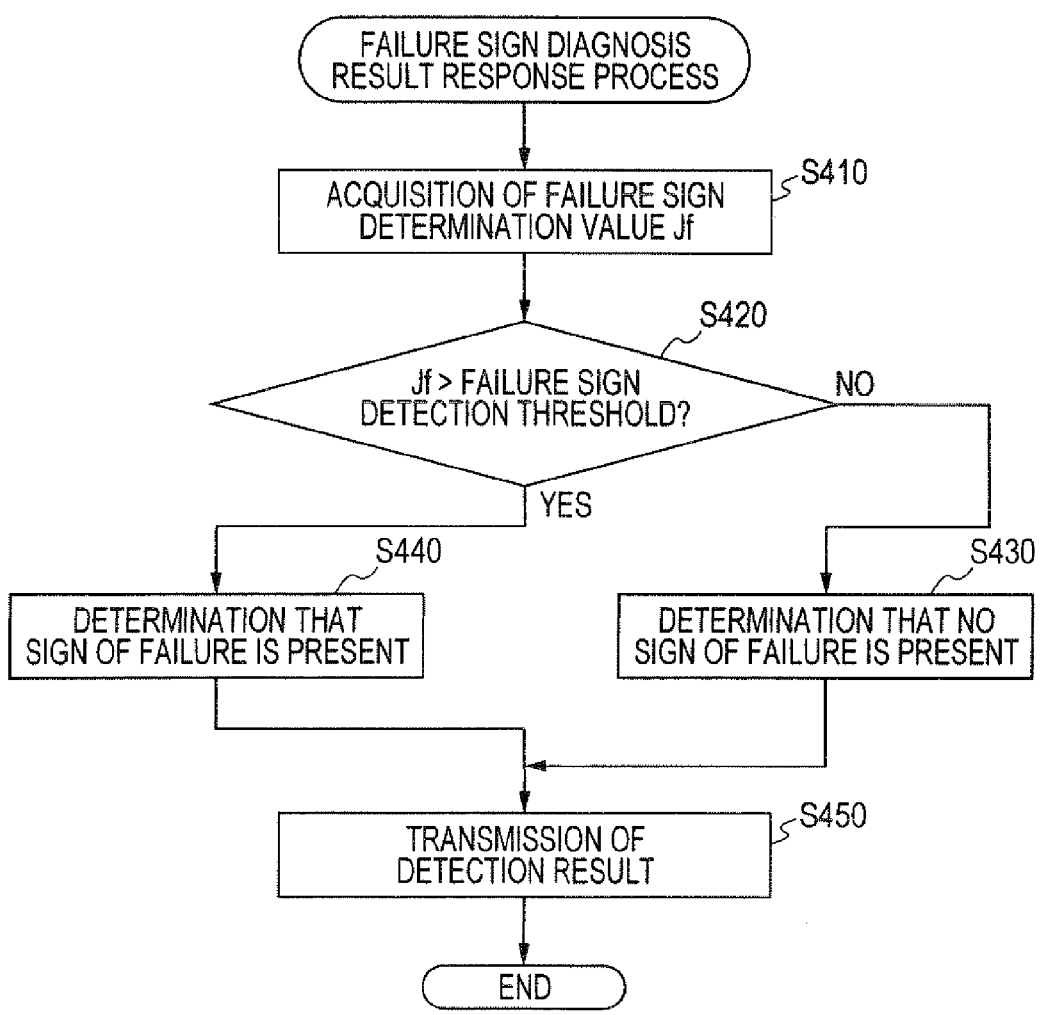
FIG. 5 is a flowchart showing a process for response with a result of a failure sign diagnosis performed in the first embodiment.

Next, the failure sign diagnosis result response process performed by the CPU 21 of the failure sign detection apparatus 2 is explained with reference to the flowchart of FIG. 5. This process is performed when the failure sign detection apparatus 2 receives a failure sign diagnosis result request message from the fault diagnosis device 12.

This process begins at step S410 to acquire the failure sign determination value Jf stored in the EEPROM in step S100. Subsequently, it is determined whether or not the failure sign determination value Jf is larger than a predetermined failure sign detection threshold in step S420. If the determination result in step S420 is negative, the process proceeds to step S430 to make a determination that there is no sign of failure in the sensor 11, and then proceeds to step S450. If the determination result in step S420 is affirmative, the process proceeds to step S440 to make a determination that there is a sign of failure in the sensor 11, and then proceeds to step S450.

In step S450, a response message indicative of the determination result in step S430 or S440 is transmitted to the fault diagnosis device 12, and then this failure sign diagnosis result response process is terminated. Next, the failure sign evaluation index reset process performed by CPU 21 of the failure sign detection apparatus 2 is explained with reference to the flowchart of FIG. 6. This process is repeatedly performed while the CPU 21 is powered on.

This process begins at step S510 to determine whether or not a message requiring reset has been received from the fault diagnosis device 12. If the determination result in step S510 is affirmative, the process proceeds to step S530. If the determination result in step S510 is negative, the process proceeds to step 520 to determine whether or not a predetermined reset determination time (24 hours, for example) has passed from the time when the fault diagnosis device 2 was powered off.

If the determination result in step S520 is negative, the process returns to step S510 to repeat the above operation. If the determination result in step S520 is affirmative, the process proceeds to step S530 to delete all the values of the failure sign evaluation index If stored in the EEPROM 24, and then proceeds to step S540 to initialize the failure sign evaluation index counter Ci to 0. Subsequently, the process proceeds to step S550 to initialize the storage position index Im so that it is set at the start position of the area to store the values of the failure sign evaluation index If. Thereafter, this process is terminated.

Next, the data structures of the failure sign diagnosis result request message transmitted from the fault diagnosis device 12 and the response message returned from the failure sign detecting apparatus 2 are explained with reference to FIGS. 8A, 8B and 8C.

Figure 8A:
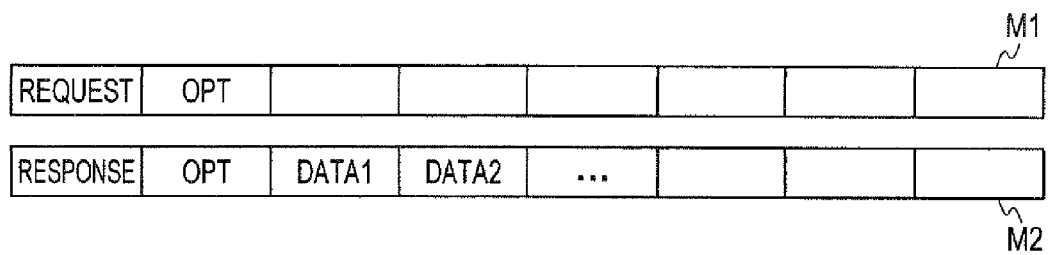
FIGS. 8A to 8C are diagrams showing the data structure of a response message used in the first embodiment.

As shown in FIG. 8A, the request message M1 is constituted of a field labeled OPT specifying the contents of a request. The response message M2 is constituted of the contents of the request specified by the field OPT, and the contents of a response DATA1, DATA2, . . . returned to the fault diagnosis device 12.

Figure 8B:
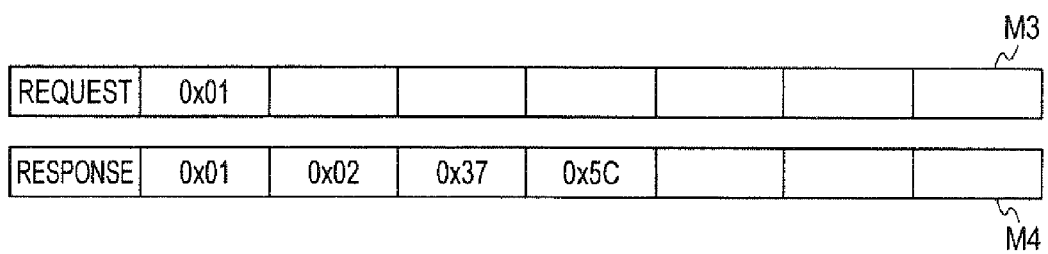

For example, as shown in FIG. 8B, when the fault diagnosis device 12 transmits the request message M3 requesting a failure sign diagnosis 0x01, the failure sign detection apparatus 2 returns the response message M4 constituted of the contents of the request 0x01 specified by the request message M3, and data 0x37 and 0x5c identifying sensors showing a sign of failure.

Figure 8C:
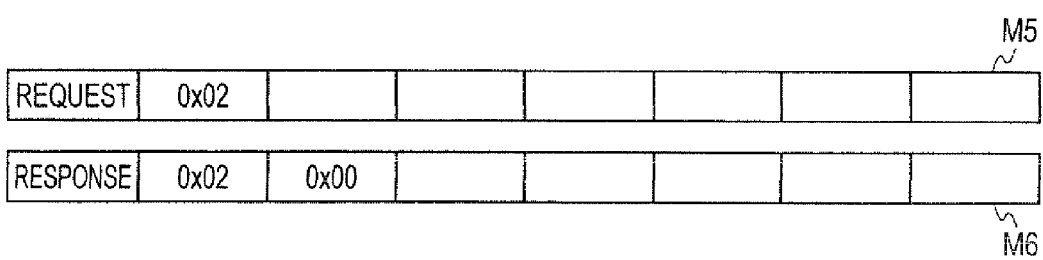

For another example, as shown in FIG. 8C, when the fault diagnosis device 12 transmits the request message M5 requesting the failure sign evaluation index reset process 0x02, the failure sign detection apparatus 2 returns the response message M6 constituted of the contents of the request 0x02 specified by the request message M, and data 0x00 showing completion of the failure sign evaluation index reset process.

Figure 9:
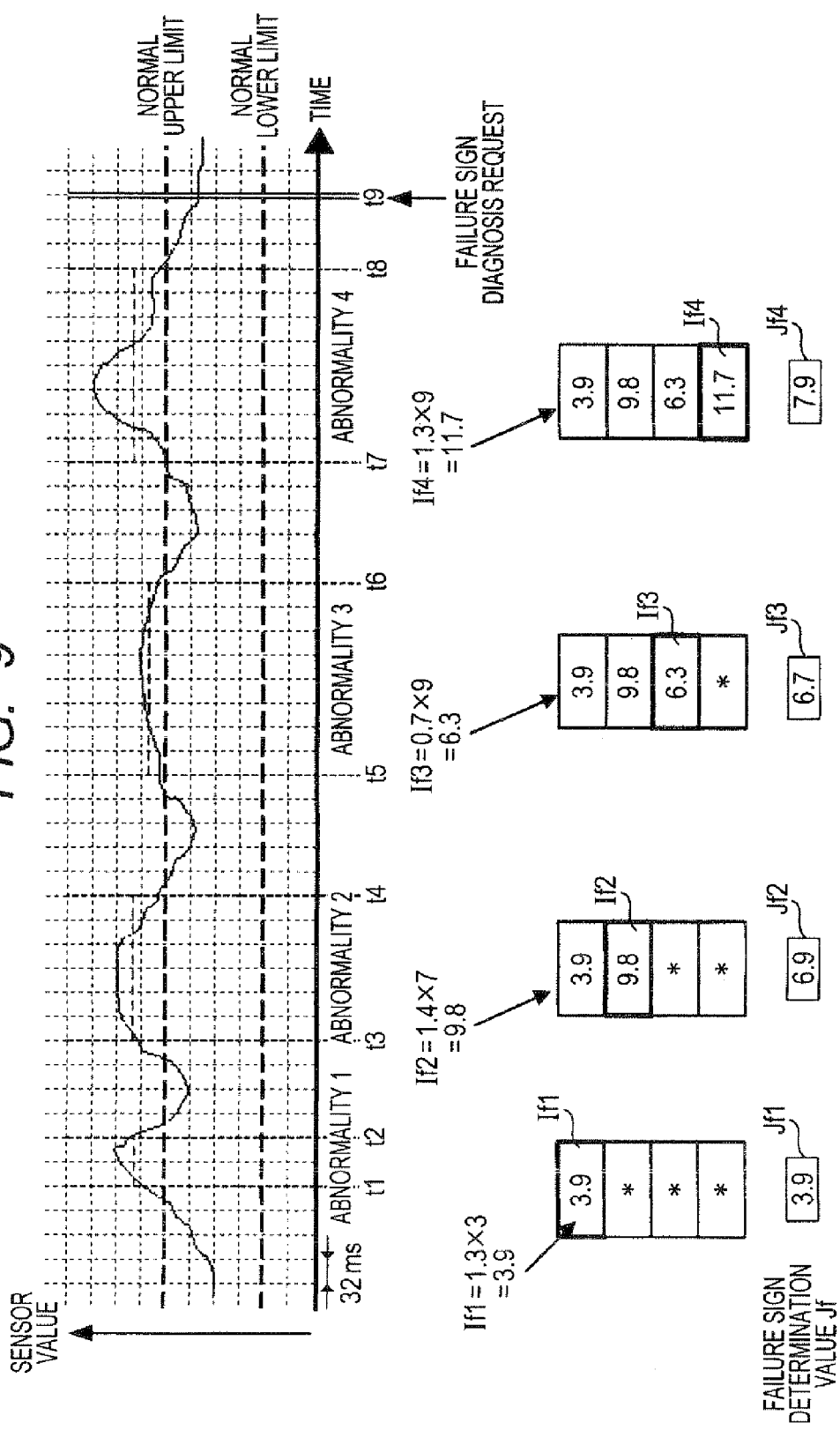
FIG. 9 is a diagram showing an example of failure sign detection performed by the first embodiment.

Next, an example of the failure sign detection performed by the failure sign detection system 1 having the above described structure is explained with reference to FIG. 9. In this example, the sensor value exceeds the normal upper limit at time t1. Thereafter, the sensor value returns below the normal upper limit after time t2. Accordingly, the failure sign evaluation index If is calculated as If1 for the period from time t1 to time t2. Since the abnormality duration period indication Tc is 3, and an average of the sensor normal threshold differences Ds is 1.3 at this time, the failure sign evaluation index If is calculated as If1=Tc×1.3=3.9. Since the failure sign evaluation index If has only one value (If1), the failure sign determination value Jf 1 at this time is equal to If1 (=3.9).

Thereafter, the sensor value exceeds the normal upper limit again at time t3. Thereafter, the sensor value returns below the normal upper threshold after time t4. Accordingly, the failure sign evaluation index If is calculated as If2 for the period from time t3 to time t4. Since the abnormality duration period indication Tc is 7, and an average of the sensor normal threshold differences Ds is 1.4 at this time, the failure sign evaluation index If is calculated as If2=Tc×1.4=9.8. Since the failure sign evaluation index If has two values (If1 and If2), the failure sign determination value Jf2 at this time is equal to an average (=6.9) of the two values If1 and If2.

Thereafter, the sensor value exceeds the normal upper limit again at time t5. Thereafter, the sensor value returns below the normal upper limit after time t6. Accordingly, the failure sign evaluation index If is calculated as If3 for the period from time t5 to time t6. Since the abnormality duration period indication Tc is 9, and an average of the sensor normal threshold difference Ds is 0.7 at this time, the failure sign evaluation index is calculated as If3=Tc×0.7=6.3. Since the failure sign evaluation index If has three values (If1, If2 and If3), the failure sign determination value Jf3 at this time is equal to an average (=6.7) of the values If1, If2 and If3 of the failure sign evaluation index If.

Thereafter, the sensor value exceeds the normal upper limit again at time t7. Thereafter, the sensor value returns below the normal upper limit after time t8. Accordingly, the failure sign evaluation index is calculated as If4 for the period from time t7 to time t8. Since the abnormality duration period indication Tc is 9, and an average of the sensor normal threshold difference Ds is 1.3 at this time, the failure sign evaluation index If is calculated as If4=Tc×1.3=11.7. Since the failure sign evaluation index If has four values (If1, If2, If3 and If4), the failure sign determining value Jf4 at this time is equal to an average (=7.9) of the values of the failure sign evaluation indexes If1, If2, If3 and If4.

Thereafter, when the failure sign diagnosis result request message is received at time t9, a comparison between the failure sign determination value Jf4 and the failure sign detection threshold (10, in this embodiment) is made, and as a result, it is determined that there is no sign of failure because the failure sign determination value Jf4 is smaller than the failure sign detection threshold.

As explained above, the failure sign detection system 1 compares the sensor value with the normal threshold, and determines whether there is an abnormality in the sensor 11 based on the result of the comparison (step S20). If it is determined that there is an abnormality in the sensor 11, the failure sign evaluation index If for evaluating a sign of failure is calculated (steps S30, S40 and S90) using the abnormality duration period and the difference (sensor normal threshold difference Ds) between the sensor value and the normal threshold.

Subsequently, the calculated value of the failure sign evaluation index If is stored (step S270), and the failure sign detection is made using the value of the calculated failure sign evaluation index If (steps S420 to S440). The failure sign detection system 1 of this embodiment uses a period over which an abnormality continues (the abnormality duration period) to calculate the failure sign evaluation index If. Accordingly, it is possible to give an abnormality continuing for a longer time a larger contribution ratio than an abnormality continuing for a shorter time in calculating the failure sign evaluation index If. This makes it possible to reduce the effect of noise causing an abnormality continuing for a short time on the detection of a sign of failure, to thereby prevent unnecessary replacement of the sensor 11 due to frequent noise.

Incidentally, for noises continuing for the same length of time, since their effects on the failure sign detection vary depending on the difference between the sensor value and the normal threshold (the sensor normal threshold difference Ds), not only the abnormality duration period but also the sensor normal threshold difference Ds is used to calculate the failure sign evaluation index If.

The calculated value of the failure sign evaluation index If is stored in the EEPROM 24. This makes it possible for a vehicle mechanic to determine whether the sensor 11 is on the brink of failure based on the values of the failure sign evaluation index If stored in the failure sign detection apparatus 2, to thereby prevent the sensor 11 on the brink of failure from being left unrepaired or unreplaced.

When an average of the values of the failure sign evaluation index If (the failure sign determination value Jf) is larger than the failure sign detection threshold (YES in step S420), it is determined that there is a sign of failure in the sensor 11 (step S440). That is, a sign of failure can be detected easily based on only the result of comparison between the average of the values of the failure sign evaluation index If and the failure sign detection threshold.

Of the sensor normal threshold differences Ds for a period over which an abnormality continues, the sensor normal threshold maximum difference Mx and the sensor normal threshold minimum difference Mn are excluded in calculating the failure sign evaluation index If. This makes it possible to reduce the effect of noise causing the sensor value to change greatly in calculating the failure sign evaluation index If.

The values of the failure sign evaluation index If stored in the EEPROM 24 and the failure sign determination value Jf are transmitted to the data center which operates to collect vehicle data (step S124). If the failure sign evaluation index If and the failure sign determination value Jf are managed collectively as failure sign information in the data center, it is possible to conduct diagnosis on the whole vehicle based on the failure sign information from the respective ECUs mounted on the vehicle, and also to keep track of a tendency of failure on a vehicle type to vehicle type basis in the vehicle market. Further, if the failure sign information stored in the failure sign detection apparatus 2 of the vehicle is lost, it is possible to refer to the failure sign information stored in the data center as back-up information.

Second Embodiment

Next, a second embodiment of the invention is described with emphasis on the difference with the first embodiment.

Figure 10:
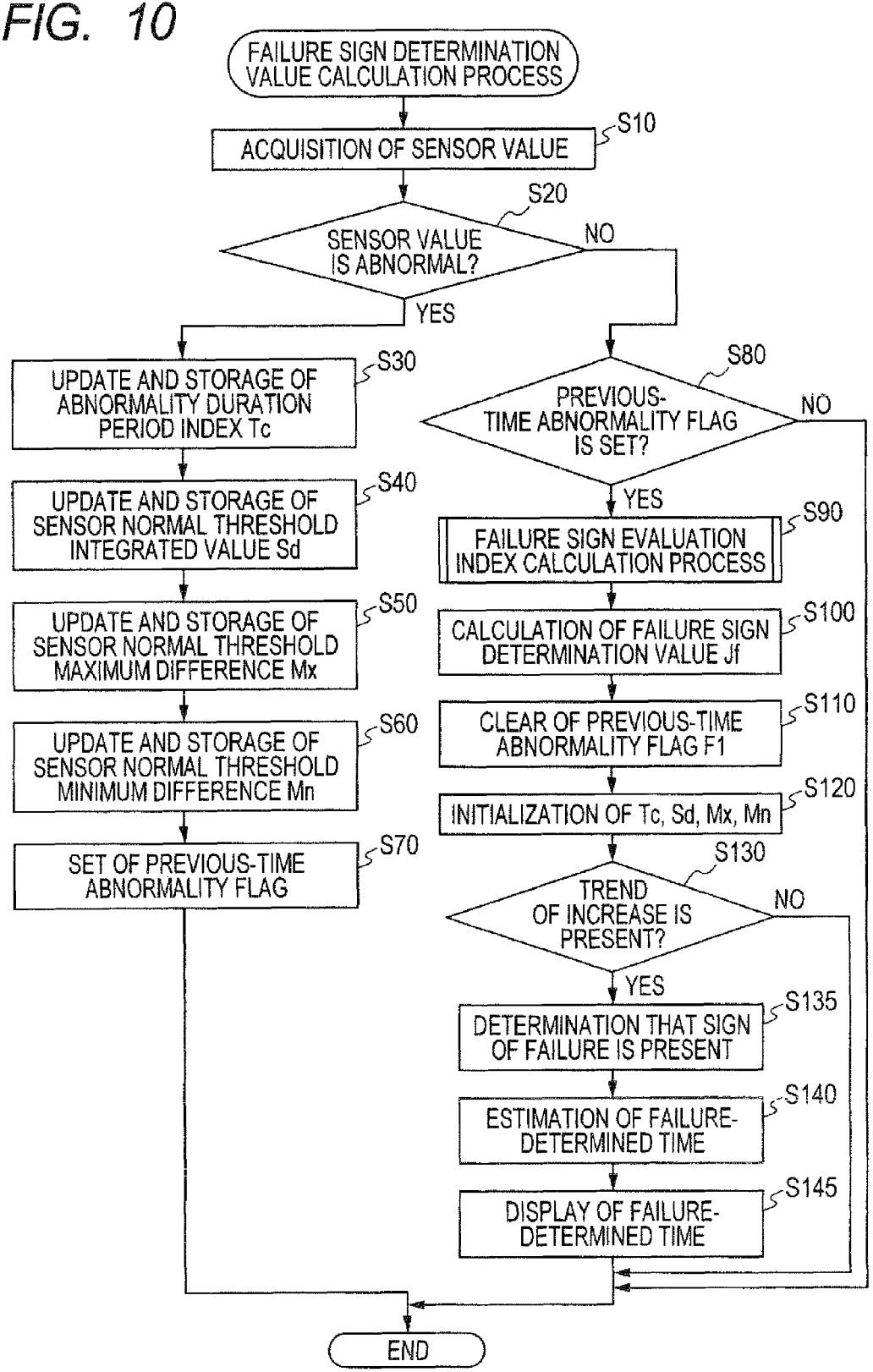
FIG. 10 is a flowchart showing a process for calculating the failure sign determination value performed in a second embodiment of the invention.

The second embodiment differs from the first embodiment in that the failure sign determination value calculating process is modified. In the following, the failure sign determination value calculating process performed in the second embodiment is explained with reference to FIG. 10.

The failure sign determination value calculating process in the second embodiment is the same as that in the first embodiment except that steps S130 to S145 are added. In the second embodiment, after completion of step S120, the process proceeds to step S130 to determine whether or not there is a tendency that the values of the failure sign evaluation index If increase with time. If the determination result in step S130 is negative, the process is terminated.

If the determination result in step S130 is affirmative, the process proceeds to step S135 to make a determination that there is a sign of failure in the sensor 11. Subsequently, the process proceeds to step S140 to estimate the time when the sensor 11 fails. More specifically, the increase rate of the failure sign evaluation index If is calculated based on its values stored in the EEPROM 24, and the time when the failure sign evaluation index If will exceed a predetermined failure detection threshold is calculated as a failure-determined time on the assumption that the failure sign evaluation index If will continue to increase at the calculated increase rate.

Figure 11:
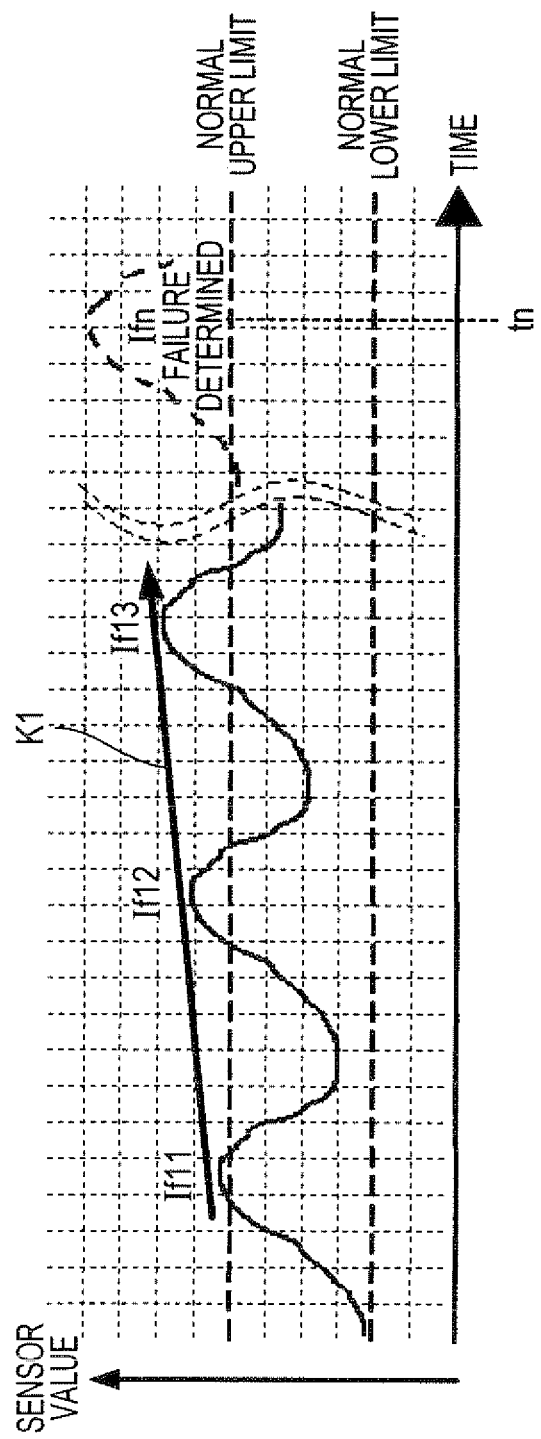
FIG. 11 is a diagram showing an example of failure sign detection performed by the second embodiment.

Subsequently, the process proceeds to step S145 to display to the effect that the sensor 11 may fail at the failure-determined time calculated in step S140 in the display device 4. Next, an example of failure sign detection by the failure sign detection system 1 having the above described structure is explained with reference to FIG. 11.

In this example, the failure sign evaluation index If is calculated as three values If11, If12 and If13 and stored in the EEPROM 24 each time the sensor value exceeds the normal upper limit and returns below the normal upper limit. Since If11<If12<If13 in this example, it is determined that the failure sign evaluation index If has a tendency to increase. Accordingly, the increase rate (the gradient K1 shown in FIG. 11) is calculated, and the time to at which the failure sign evaluation index If will exceed the predetermined failure detection threshold value (see the failure sign evaluation index value Ifn shown in FIG. 11) on the assumption that the failure sign evaluation index If will continue to increase at this rate.

Returning to FIG. 10, it is determined whether or not there is a tendency that the failure sign evaluation index If increases with time in step S130. If the determination result in step S130 is affirmative, the process proceeds to step S135 to make a determination that there is a sign of failure in the sensor 11.

Step S135 makes it possible to determine that there is a sign of failure before the failure sign determination value Jf reaches the failure sign detection threshold. Accordingly, the second embodiment can detect a sign of failure earlier than the first embodiment, if there is a tendency that the failure sign evaluation index If increases with time.

Subsequent to step S135, the failure-determined time of the sensor 11 is estimated based on the increase rate of the failure sign evaluation index If in step S140. Accordingly, the driver and passenger of the vehicle can know when the sensor 11 will fail. This makes it possible to repair or replace the sensor 11 at an appropriate timing, because the driver or passenger of the vehicle can easily determine whether the sensor 11 has to be repaired or replaced immediately, or the sensor 11 can be used for a time.

If the determination result in step S135 is affirmative, a notice is displayed that the sensor 11 may fail in the display device 4 in step S145. Accordingly, the driver or passenger can identify a vehicle-mounted device showing a sign of failure. This makes it possible for the driver or passenger of the vehicle to order repair or replacement of a device showing a sign of failure before arriving at a vehicle dealer, for example.

Third Embodiment

Next, a third embodiment of the invention is described with emphasis on the difference with the first embodiment.

The third embodiment differs from the first embodiment in that the failure sign determination value calculating process is modified. In the third embodiment, the sensor 11 is an accumulator pressure sensor.

Figure 12:
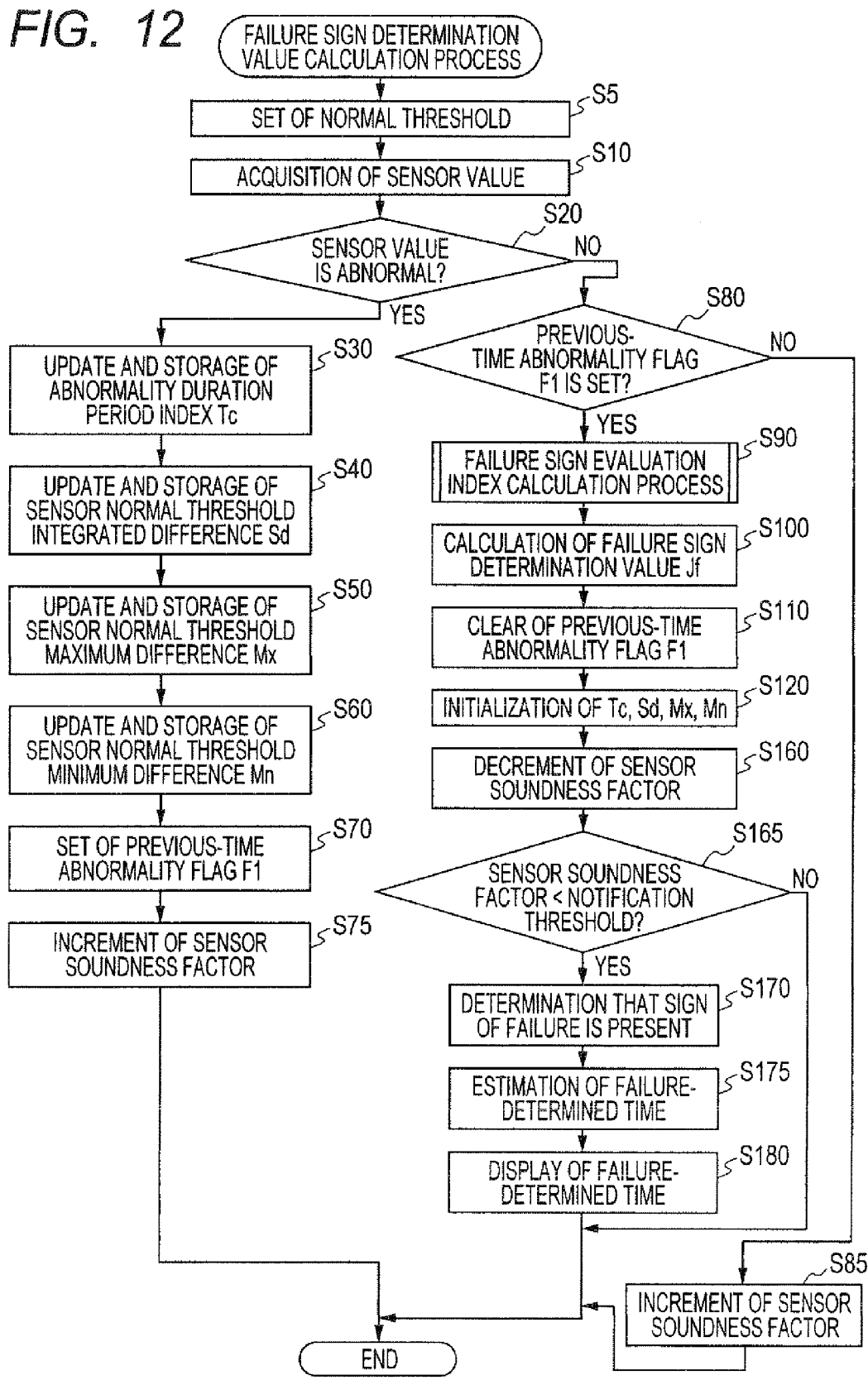
FIG. 12 is a flowchart showing a process for calculating the failure sign determination value performed in a third embodiment of the invention.

In the following, the failure sign determination value calculating process in the third embodiment is explained with reference to the flowchart of FIG. 12. The failure sign determination value calculating process in the third embodiment is the same as that in the first embodiment except that steps S5, S75, S85 and S160 to S180 are added.

In this embodiment, the failure sign determination value calculating process begins at step S5 where the CPU 21 sets the normal threshold depending on the load of the vehicle. For example, when the vehicle is driven roughly and harsh braking is applied frequently, the CPU 21 determines that the load of the vehicle is high, and accordingly, lowers the normal upper limit and raises the normal lower limit depending on the load of the vehicle. That is, the normal threshold is set such that occurrence of an abnormality can be easily detected. Thereafter, the process proceeds to step S10.

After completion of step S70, the process proceeds to step S75 to increase a sensor soundness factor indicative of a degree of soundness of the sensor 11 by a certain increment. This increment is predetermined in accordance with the recovery of the state of the sensor 11 for a lapse of 32 ms. The sensor soundness factor is initially set to 100%. The upper limit of the sensor soundness factor is 100%, and the lower limit of the sensor soundness factor is 0%.

In this embodiment, if the determination result in step S80 is affirmative, that is, if the previous-time abnormality flag F1 is cleared, the process proceeds to step S85 to increase the sensor soundness factor by the predetermined increment, and then is terminated.

After completion of step S120, the process proceeds to step S160 to decrease the sensor soundness factor by a decrement set to a larger value when the value of the failure sign evaluation index calculated in step S90 is larger. Subsequently, the calculated sensor soundness factor is stored in the EEPROM while being associated with the present time.

Thereafter, the process proceeds to step S165 to determine whether or not the sensor soundness factor calculated in step S160 is lower than a predetermined notification threshold (20% in this embodiment) to inform the driver and passenger of the vehicle of presence of a sign of failure. If the determination result in step S165 is negative, the process is terminated.

If the determination result in step S165 is affirmative, the process proceeds to step S170 to make a determination that there is a sign of failure in the sensor 11. Subsequently, the failure-determined time of the sensor 11 is estimated in step S175. More specifically, the decrease rate of the sensor soundness factor is calculated based on the values of the sensor soundness factor stored in the EEPROM 24, the time when the sensor soundness factor will fall to 0% is calculated on the assumption that the sensor soundness factor will decrease at this calculated decrease rate, and this calculated time is determined as the failure-determined time of the sensor 11.

Thereafter, the process proceeds to step S180 to display to the effect that the sensor 11 may fail at the failure-determined time calculated in step S175 in order to induce repair or replacement of the sensor 11, and then is terminated.

Next, an example of failure sign detection performed by the failure sign detection system 1 having the above described structure is explained with reference to FIG. 13. The normal upper limit and the normal lower limit vary depending on the load of the vehicle (see the arrows Y21 and Y22 in FIG. 13). In this example, the failure sign evaluation index If is calculated as six values If21, If22, If23, If24, If25 and If26 and stored in the EEPROM 24 each time the sensor value exceeds the normal upper limit and returns below the normal upper limit or each time the sensor value falls below the normal lower limit and returns above the normal lower limit. Also, when the values If21, If22, If23, If24, If25 and If26 are calculated, the sensor value is decreased by decrements Qd21, Qd22, Qd23, Qd24, Qd25 and Qd26, respectively. During a period in which the failure sign evaluation index If is not calculated, the sensor soundness factor increases by a value depending on the length of the period.

Accordingly, since the sensor soundness factor at the time when the failure sign evaluation index If is calculated is lower than the notification threshold (time t26 in FIG. 13), the decrease rate of the sensor soundness factor is calculated (gradient K21 in FIG. 13), and the time when the sensor soundness factor will decrease to 0% (time t27 in FIG. 13) is calculated as the failure-determined time of the sensor 11 on the assumption that this decrease rate will be maintained.

Figure 13:
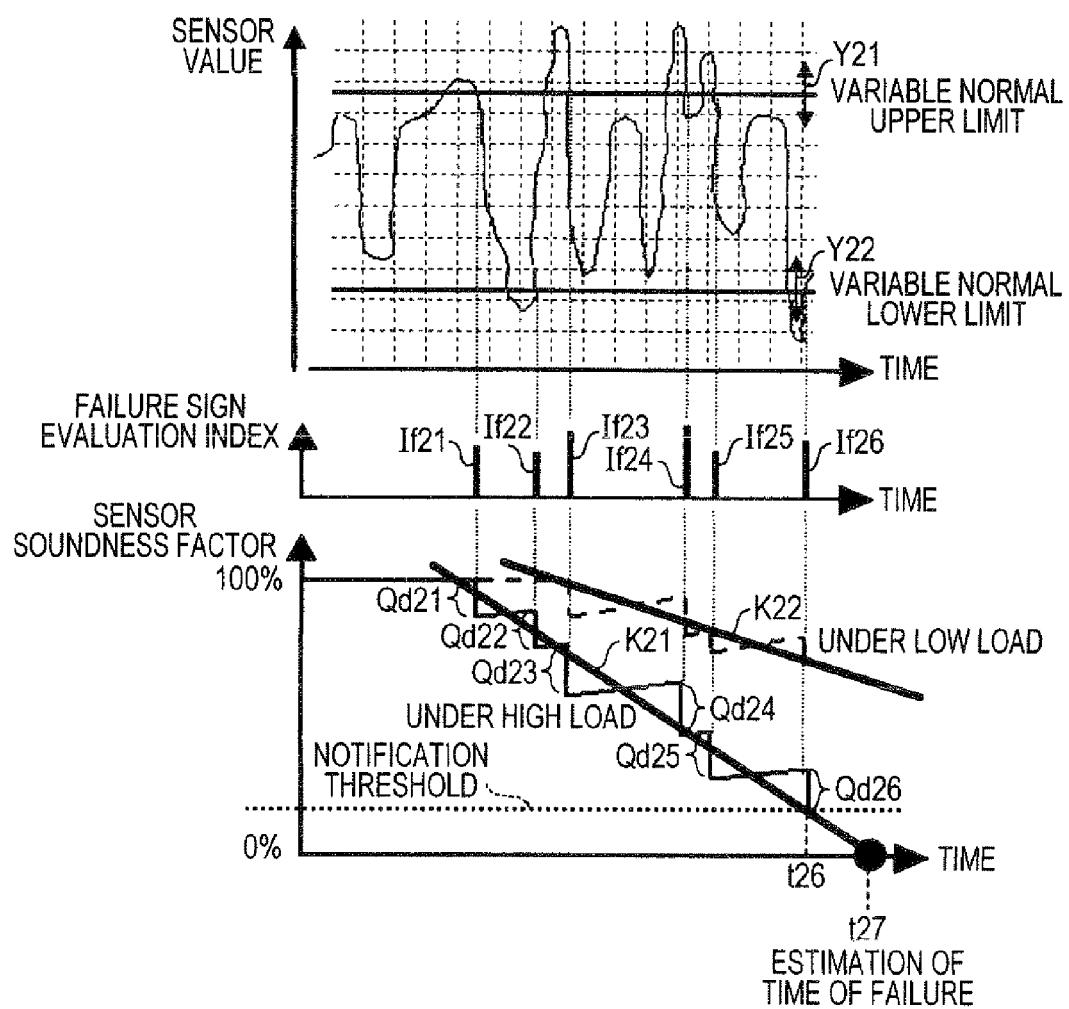
FIG. 13 is a diagram showing an example of failure sign detection performed by the third embodiment.

When the load of the vehicle is low, since the failure sign evaluation index If is small compared to when the load of the vehicle is high, the decrease rate of the sensor soundness factor becomes small (gradient K22 in FIG. 13). The failure sign detection system 1 having the above described structure decreases the sensor soundness factor in accordance with the magnitude of the failure sign evaluation index If, and determines that there is a sign of failure in the sensor 11 (step S170) if the sensor soundness factor is smaller than the notification threshold (YES in step S165). Hence, it is possible to make a determination whether there is a sign of failure based on only the magnitude relationship between the sensor soundness factor and the notification threshold.

The failure-determined time of the sensor 11 is estimated based on the decrease rate of the sensor soundness factor (step S175), and the estimated failure-determined time is notified to the driver and passenger of the vehicle. This makes it possible to repair or replace the sensor 11 at an appropriate timing, because the driver and passenger can easily determine whether the sensor 11 has to be repaired or replaced immediately, or the sensor 11 can be used for a time.

The normal threshold is set in accordance with the load of the vehicle equipped with the failure sign detection system 1 (step S5). That is, when the vehicle is under a condition that the sensor 11 may easily fail, the normal threshold is changed so that occurrence of failure of the sensor 11 can be easily and promptly detected. This improves the detection accuracy of the failure detection.

It is a matter of course that various modifications can be made to the above described embodiments as described below. In the first embodiment, all the values of the failure sign evaluation index If are deleted from the EEPROM 24 through the failure sign evaluation index reset process shown in FIG. 6 when the reset determination time has elapsed from the time when the power was turned off. However, the first embodiment may be modified such that of the values of the failure sign evaluation index If stored in the EEPROM 24, the one or ones above a predetermined level is not deleted. In the following, an example of the failure sign detection performed by the failure sign detection system 1 modified as above is explained with reference to FIG. 14.

Figure 6:
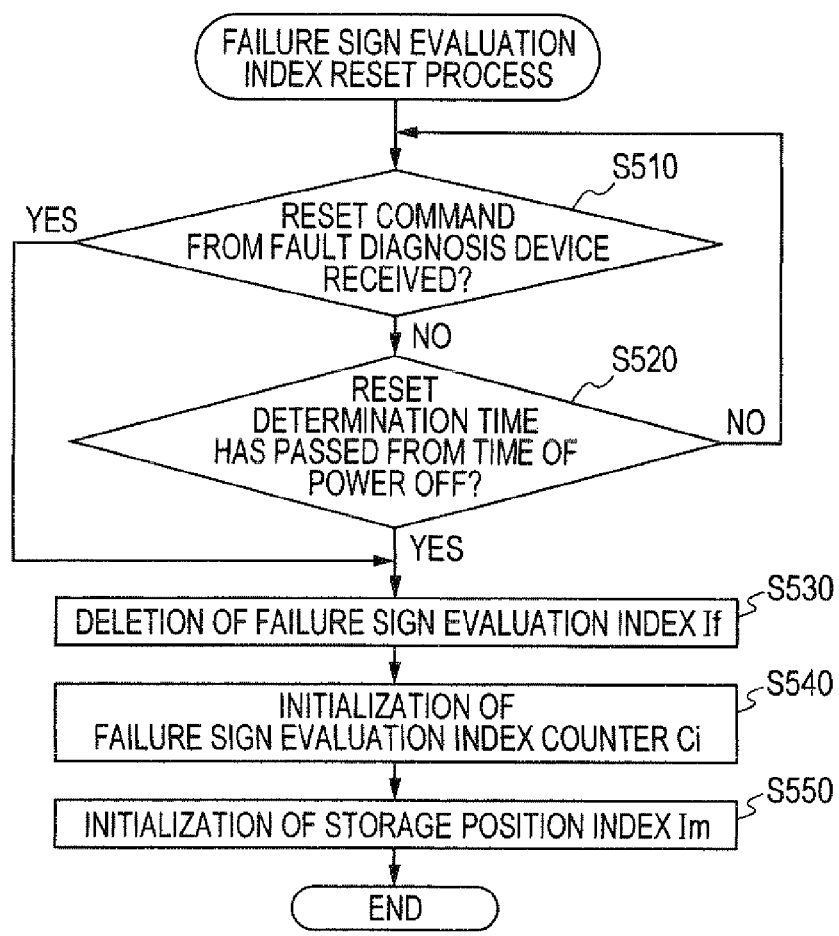
FIG. 6 is a flowchart showing a process for resetting the failure sign evaluation index performed in the first embodiment.

This example is directed to a case where the sensor value becomes abnormal only immediately after the ignition switch IG is turned on, and thereafter returns to normal. In such a case, there is a problem that data to detect a sign of failure that occurs only immediately after the ignition switch IG is turned on is lost each time the failure sign evaluation index reset process shown in FIG. 6 is performed when the ignition switch IG has not been turned on for a time.

Figure 14:
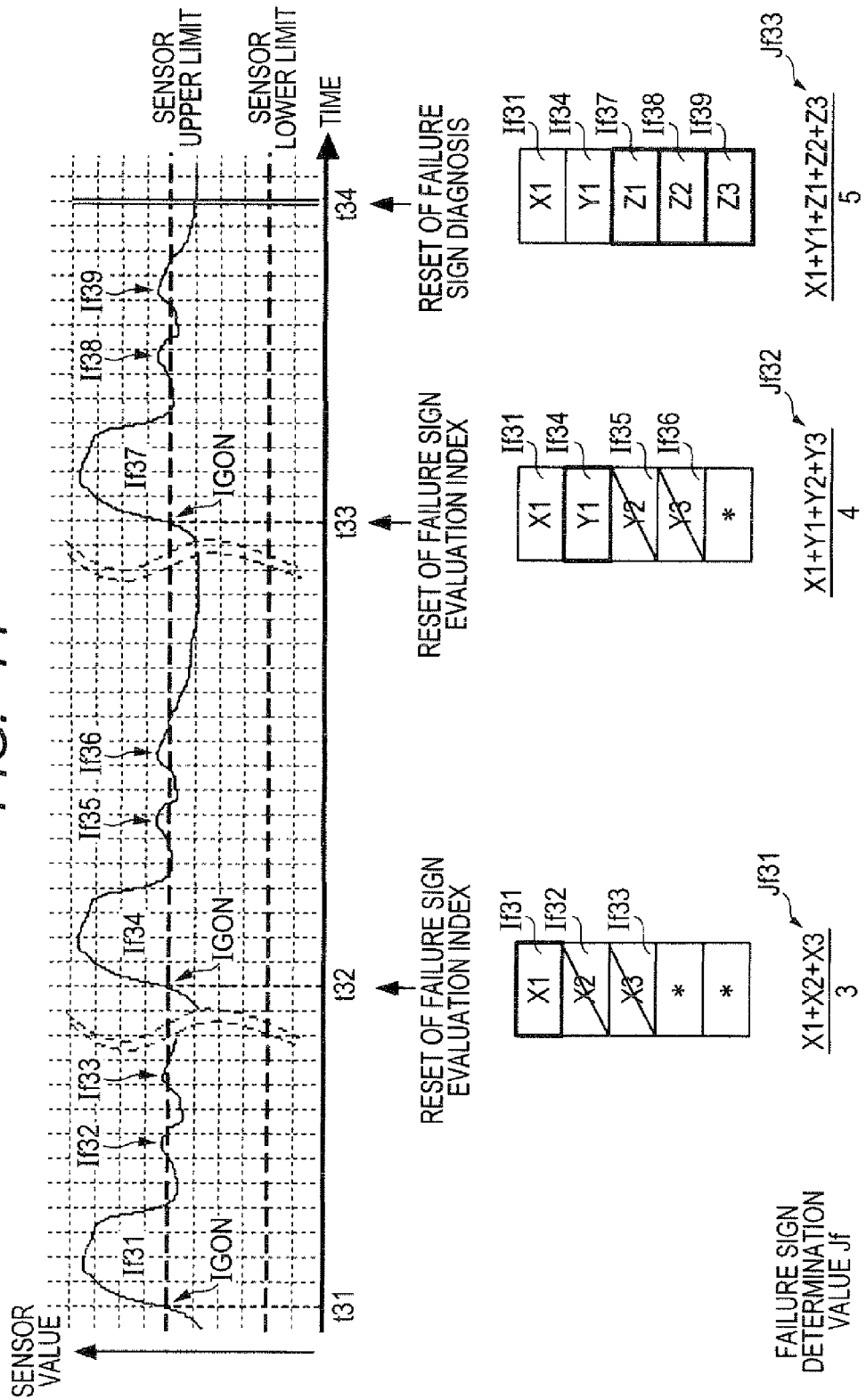
FIG. 14 is a diagram showing an example of failure sign detection performed by a first modification of the first embodiment.

As shown in FIG. 14, after the ignition switch IG is turned on at time t31, the failure sign evaluation index If is calculated as three values If31, If32 and If33 and stored in the EEPROM 24 each time the sensor value exceeds the normal upper limit and returns below the normal upper limit. Subsequently, the failure sign determination value Jf is calculated as {(X1+X2+X3)/3}, where X1, X2 and X3 are the values If31, If32 and If33, respectively (the failure sign determination value Jf31 in FIG. 14). At this time, the failure sign determination value Jf is lower than the failure sign detection threshold.

When the ignition switch IG is turned on at time t32 after being turned off, the failure sign evaluation index value If 31 which is above a predetermined exclusion level is maintained and the other failure sign evaluation index values If 32 and 33 are deleted. Thereafter, the failure sign evaluation index If is calculated as values If34, If35 and If36 and stored in the EEPROM 24 each time the sensor value exceeds the normal upper limit and returns below the normal upper limit. At this time, the failure sign determination value Jf is calculated as {(X1+Y1+Y2+Y3)/4}, where Y1, Y2 and Y3 are the values If34, If35 and If36, respectively (the failure sign determination value Jf32 in FIG. 14). At this time, the failure sign determination value Jf lower than the failure sign detection threshold.

When the ignition switch IG is turned on at time t33 after being turned off thereafter, the failure sign evaluation index values If 31 and If 34 which are above the predetermined exclusion level are maintained, and the other failure sign evaluation index values If 35 and IF36 are deleted. Further, the failure sign evaluation index If is calculated as values If37, If38 and If39 and stored in the EEPROM 24 each time the sensor value exceeds the normal upper limit and returns below the normal upper limit. At this time, the failure sign decision value Jf is calculated as {(X1+Y1+Z1+Z2+Z3)/5}, where Z1, Z2 and Z3 are the values If37, If38 and If39, respectively (the failure sign determination value Jf33 in FIG. 14). At this time, the failure sign determination value Jf exceeds the failure sign detection threshold.

Thereafter, when the failure sign diagnosis result request message is received at time t34, a comparison is made between the failure sign determination value Jf33 and the failure sign detection threshold, and as a result, it is determined that there is a sign of failure.

As explained above, according to this modification, it is possible to detect a sign of failure for a sensor whose sensor value becomes abnormal only immediately after the ignition switch IG is turned on. In the first embodiment, the failure sign evaluation index If is calculated each time the sensor value exceeds the normal upper limit and thereafter returns below the normal upper limit. However, the first embodiment may be modified such that the failure sign evaluation index If is calculated at each regular detection period.

According to such a modification, it is possible to detect a sign of failure for a sensor whose sensor value becomes abnormal frequently during each regular detection period even if a difference between the sensor value and the normal threshold (the sensor normal threshold difference Ds) is small, because the sum of the values of the failure sign evaluation index If becomes large during each regular detection period.

Figure 15:
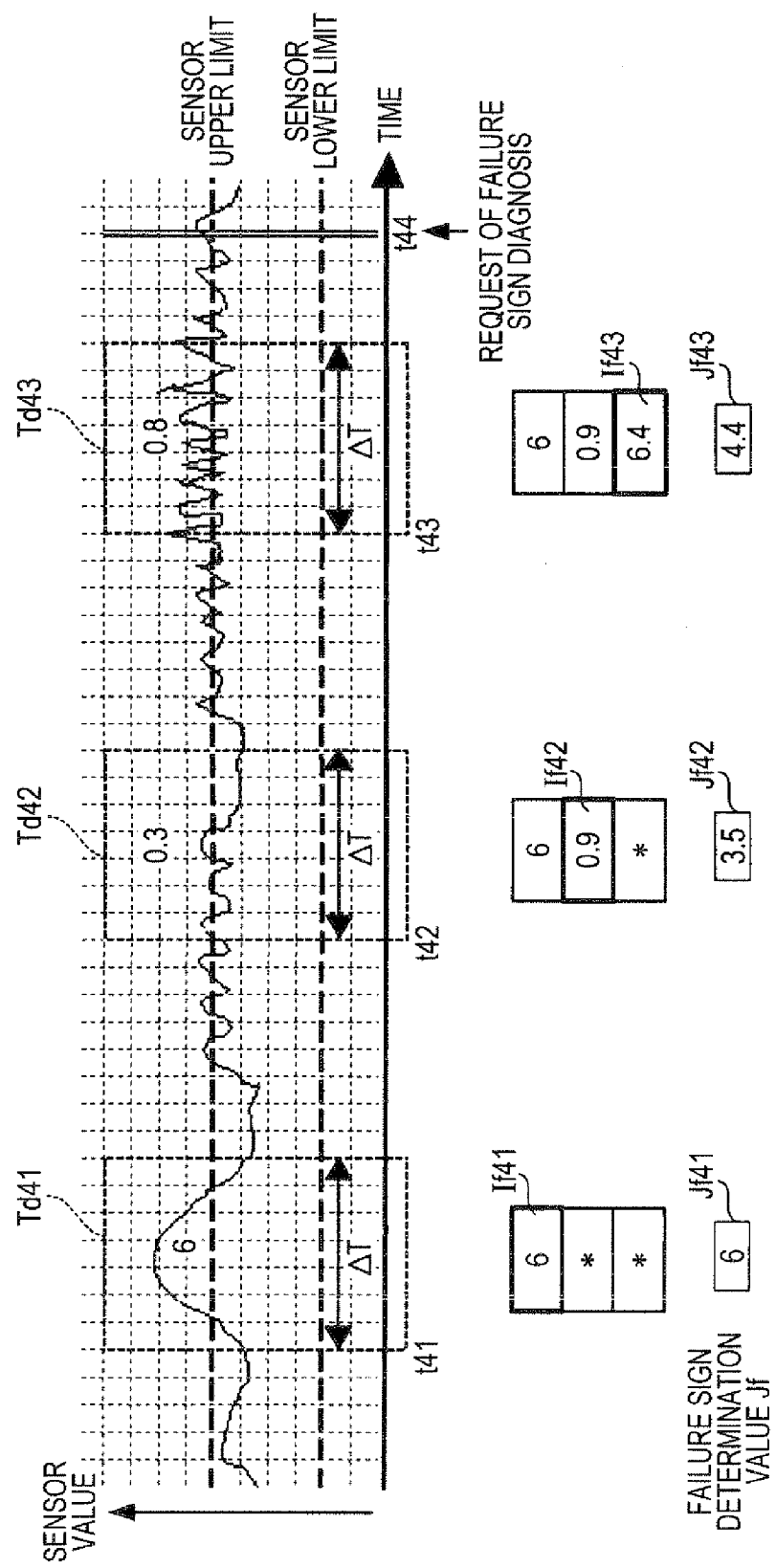
FIG. 15 is a diagram showing an example of failure sign detection performed by a second modification of the first embodiment.

In the following, an example of the operation of the failure sign detection system 1 modified as above is described with reference to FIG. 15. This example is directed to a sensor whose sensor value becomes abnormal slightly but frequently. In this example, as shown in FIG. 15, the failure sign evaluation index If is calculated during a detection period Td41 starting at time t41 and ending after a lapse of time of deltaT. Since the failure sign evaluation index If has only one value which is 6, the failure sign evaluation index value If41 is calculated as 6 for this detection period. Further, since the failure sign evaluation index If has only the one value of If41, the failure sign determination value Jf41 at this moment is equal to If41=6.

Next, the failure sign evaluation index If is calculated during a detection period Td42 starting at time t42 and ending after a lapse of time of deltaT. Since the failure sign evaluation index If has three values, and their average is 0.3, the failure sign evaluation index value If42 is calculated as 0.9 for this detection period. Since the failure sign evaluation index If has the two values of If41 and If42, the failure sign determination value Jf42 at this moment is equal to their average which is 3.5.

Thereafter, the failure sign evaluation index If is calculated during a detection period Td 43 starting at time t43 and ending after a lapse of time of deltaT. Since the failure sign evaluation index If has eight values, and their average is 0.8, the failure sign evaluation index value If43 at this time is calculated as 6.4 for this detection period. Since the failure sign evaluation index If has the three values of If41, If42 and If43, the failure sign determination value Jf43 at this moment is equal to their average which is 4.4

Thereafter, when the failure sign diagnosis result request message is received at time t44, a comparison is made between the failure sign determination value Jf43 and the failure sign detection threshold (10 in this moment), and as a result, it is determined that there is no sign of failure.

As described above, according to this modification, for slight abnormalities successively occurring during a short period of time, the failure sign evaluation index If can be calculated on a blanket basis, and not individually. That is, according to this modification, when slight abnormalities occur successively during a short period of time, it is possible to evaluate the failure sign evaluation indexes of these abnormalities by the similar weight (the failure sign index value If43, for example) as a weight at which the failure sign evaluation index of an average abnormality (the failure sign evaluation index value If41, for example) is evaluated.

Figure 16:
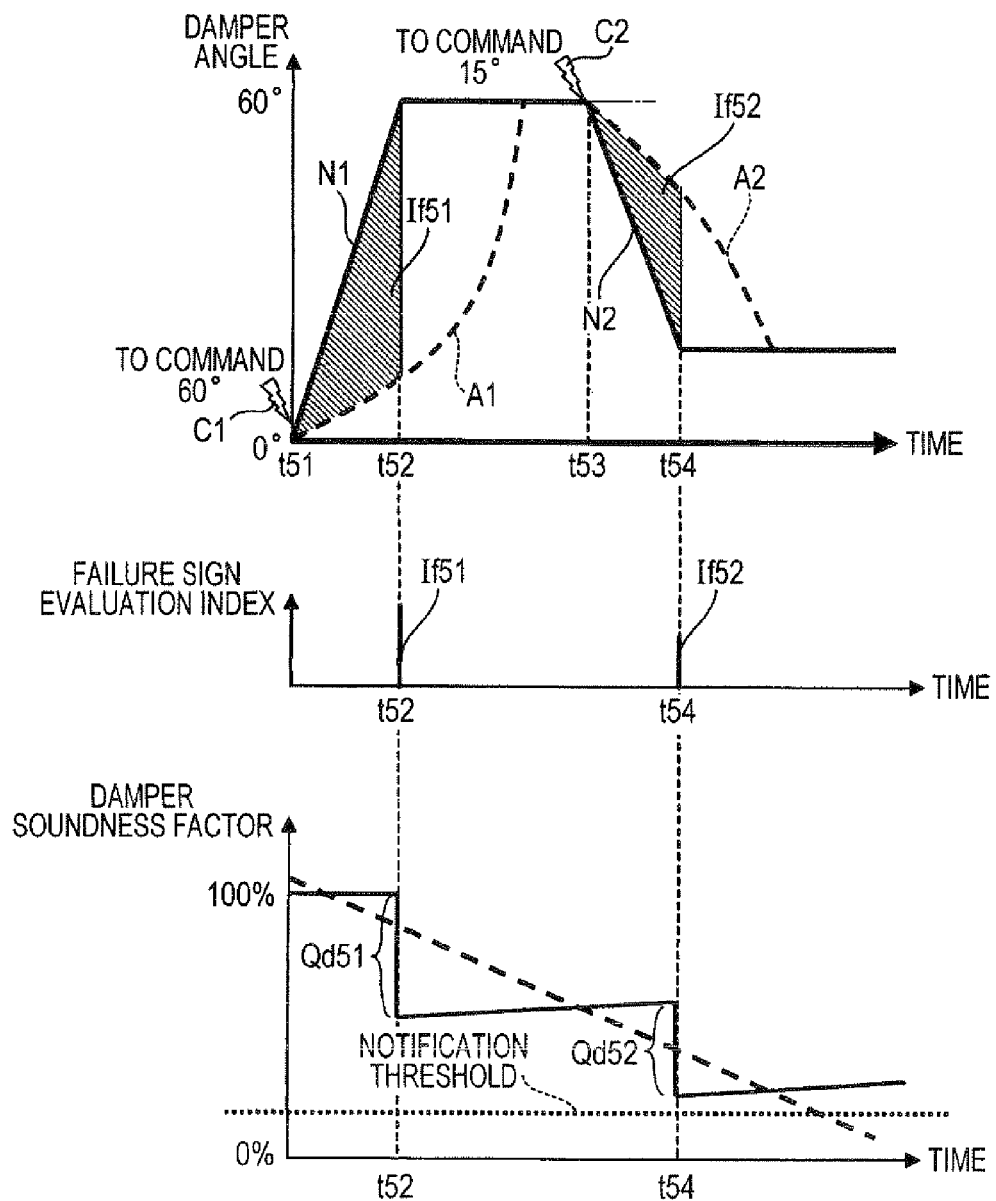
FIG. 16 is a diagram showing an example of failure sign detection performed by one of the embodiments of the invention.

The above embodiments are for detecting a sign of failure of an electrical signal input device (the sensor 11), the present invention can be used for detecting a sign of failure of a mechanical power output device (actuator) such as an air mix damper. FIG. 16 is a diagram showing an example of detection of a sign of failure of an air mix damper performed by the failure sign detection system 1 described above.

As shown in FIG. 16, when an operation instruction C1 is issued at time t51 to change the damper angle A1 from 0 degrees to 60 degrees, a commanded damper angle N1 increases linearly from 0 degrees, and reaches the target angle of 60 degrees at time t52. As a result, the damper angle changes gradually from 0 degrees to 60 degrees along the broken line A1.

During this change, an integrated value of the difference between the commanded damper angle and the damper angle over the period from the time t51 when the operation instruction C1 is issued to the time t52 when the commanded damper angle reaches the target angle of 60 degrees is calculated as the failure sign evaluation index value If51. The difference is due to deterioration of the air mix damper, which delays response of the damper to the commanded damper angle.

Thereafter, when an operation instruction C2 is issued at time t53 to change the damper angle to 15 degrees, the commanded damper angle N2 decreases linearly from 60 degrees, and reaches the target angle of 15 degrees at time t54. As a result, the damper angle changes gradually from 65 degrees to 15 degrees.

During this change, an integrated value of the difference between the commanded damper angle and the damper angle over the period from the time t53 when the operation instruction 2 is issued to the time t54 when the commanded damper angle reaches the target angle of 15 degrees is calculated as the failure sign evaluation index value If52.

In the above operations, the damper soundness factor decreases by decrements Qd51 and Qd52, respectively in accordance with the failure sign evaluation index values If52 and If53. If there is a period during which the failure sign evaluation index If is not calculated, the damper soundness factor increases in accordance with the length of this period.

In the first embodiment, a sign of failure of one sensor (the sensor 11) is detected. However, it is possible to detect a sign of failure for each of a plurality of sensors. In this case, the first embodiment may be modified such that the failure sign evaluation index is calculates for each of the sensors, and a determination is made whether there is a sign of failure based on the sum of the values of the calculated values, so that the failure sign detection is collectively performed for these sensors. This modification is advantageous, for example, in a case where two sensors relevant to each other are mounted on a vehicle, and an abnormality is assumed to be present if the values of the failure sign evaluation indexes of both the sensors are large.

Further, the first embodiment may be modified to detect a sign of failure for each of a plurality of sensors based on a proportion of the value of the failure sign evaluation index of each sensor with respect to the sum of the values of the failure sign evaluation indexes of all the sensors, so that the failure sign detection is collectively performed for these sensors. This modification is advantageous, for example, in a case where two sensors related to each other are mounted on a vehicle, and an abnormality is assumed to be present if the value of the failure sign evaluation index If of one of the two sensors is large, and the value of the failure sign evaluation index If of the other sensor is small.

In the third embodiment, the normal threshold is set depending on the load of the vehicle. However, the normal threshold may be set depending on the driver's driving aptitude, climate condition, road condition, etc., so that an abnormality can be detected easily when the vehicle is in a state where the sensors mounted on the vehicle may easily fail.

In the first embodiment, a failure sign diagnosis is performed when the failure sign detection apparatus 2 receives the failure sign diagnosis result request message from the failure diagnosis device 12. However, a failure sign diagnosis may be performed at regular time intervals, and the result may be displayed or stored, so that the driver and passenger of the vehicle are informed of the state of the sensor 11.

In this case, a threshold to determine that a sign of failure has occurred may be different from a threshold to determine that a sign of failure has disappeared. By using such a hysteresis threshold, it becomes possible to prevent a light to indicate a sign of failure from flickering to thereby prevent the driver and passenger of the vehicle from feeling concerned.

In the first embodiment, all the values of the failure sign evaluation index If are deleted from the EEPROM 24 when the reset determination time has elapsed from the time when the power was turned off. However, in a case where a sign of failure is detected for each of a plurality of sensors, the values of the failure sign evaluation indexes If of these sensors may be selectively deleted in accordance with the types of these sensors. This makes it possible that for desired ones of theses sensors, the values of the failure sign evaluation indexes If are not deleted for a long period of time.

In the first embodiment, the values of the failure sign evaluation index If are stored in the positions shown by the storage position index Im. However, they may be stored in a queue. In this case, since each time a new value of the failure sign evaluation index If is calculated, the oldest value is deleted, it is possible to omit the failure sign evaluation index reset process shown in FIG. 6.

The first embodiment may be modified such that when the failure sign evaluation index exceeds a predetermined value, it is informed to the driver and passenger of the vehicle, and data on the relevant sensor is displayed as required, and thereafter, if a determination that the sensor has failed has been made, it is informed to the driver and passenger by a warning light, for example. By making a difference between the way to inform that a sign of failure of a sensor has detected and the way to inform that the sensor is determined to have failed, the driver and passenger can prepare themselves for failure of the sensor. Further, by displaying data on the sensor showing a sign of failure, the driver and passenger can decide whether to repair the sensor immediately, or to use the sensor for a time before it fails.

The above embodiments may be configured not to calculate the failure sign evaluation index for the sensor determined to have failed. This makes it possible to prevent that the failure sign evaluation index values for a first sensor which is about to fail are deleted in order to store the failure sign evaluation index values for a second sensor that has been determined to have failed, so that a cause of failure of the first sensor can be investigated by a vehicle mechanic, for example.

Further, the above embodiments may be configured that after a third sensor has been determined to have failed, the failure sign evaluation index of a fourth sensor related to the third sensor is not calculated. This makes it possible to prevent that when failure of the third sensor causes the fourth sensor to fail, the failure sign evaluation index values for the third sensor determined to have failed are deleted in order to store the failure sign evaluation index values for the fourth sensor which is about to fail so that a cause of failure of the third sensor can be investigated by a vehicle mechanic, for example.

Further, the above embodiments may be configured to inhibit using the output value of a sensor determined to have failed for vehicle control, may be provided with a plurality of tables for different degrees of deterioration of the sensor indicated by the failure sign evaluation index values, each table showing a correspondence between the output value of the sensor and a value to be measured, and may be configured to select one of the tables to be used when the sensor has determined to have deteriorated in accordance with the degree of deterioration of the sensor. This makes it possible to use a sensor for vehicle control even if the sensor has deteriorated. For example, the thermal electromotive force of a temperature sensor of the thermocouple type may be lowered due to corrosion or rust in its metal portion. According to the above configuration, since the correspondence between the output value of the temperature sensor and a temperature to be measured can be dynamically changed in accordance with the degree of deterioration of the temperature sensor, it is possible to perform accurate temperature detection using the temperature sensor of the thermocouple type for a long period of time.

In the second embodiment, the time when the sensor 11 will fail (the fail-determined time of the sensor 11) is estimated and informed. However, the distance which the vehicle will travel before the sensor 11 fails may be estimated and informed.

The above explained preferred embodiments are exemplary of the invention of the present application which is described solely by the claims appended below. It should be understood that modifications of the preferred embodiments may be made as would occur to one of skill in the art.

What is claimed is:

1. A failure sign detection apparatus comprising:
an abnormality detection means to make a comparison between a failure detection parameter of a vehicle device mounted on a vehicle and a predetermined abnormality detection threshold, and make a determination whether there is an abnormality in the vehicle device based on a result of the comparison, wherein the predetermined abnormality detection threshold is set depending on a load of the vehicle by lowering a normal upper limit and raising a normal lower limit;
a failure sign evaluation index calculation means to calculate, when the abnormality detection means determines that there is the abnormality in the vehicle device, an abnormality duration period over which the detected abnormality continues, and a parameter threshold difference indicative of a difference between the abnormality detection threshold and the failure detection parameter, and determine a product of the abnormality duration period and the parameter threshold difference as a failure sign evaluation index for evaluating a sign of failure of the vehicle device;
a storage means to store the failure sign evaluation index calculated by the failure sign evaluation index calculation means; and
a failure sign detection means to detect the sign of failure of the vehicle device based on the failure sign evaluation index calculated by the failure sign evaluation index calculation means and stored in the storage means.

2. The failure sign detection apparatus according to claim 1, wherein the failure sign detection means is configured to calculate an average of a plurality of values of the failure sign evaluation index successively calculated by the failure sign evaluation index calculation means, and determine that there is the sign of failure if the calculated average is larger than a predetermined first failure sign detection threshold.

3. The failure sign detection apparatus according to claim 1, wherein the failure sign detection means is configured to determine that there is the sign of failure upon determining that there is a tendency that the failure sign evaluation index calculated by the failure sign evaluation index calculation means increases with time.

4. The failure sign detection apparatus according to claim 3, further comprising a first failure-determined time estimation means to estimate a time when the vehicle device fails as a failure-determined time based on an increase rate of the failure sign evaluation index.

5. The failure sign detection apparatus according to claim 1, wherein the failure sign detection means is configured to decrease a device soundness factor indicative of a degree of soundness of the vehicle device in accordance with a value of the failure sign evaluation index calculated by the failure sign evaluation index calculation means, and determine that there is the sign of failure in the vehicle device if the device soundness factor is lower than a predetermined failure sign detection threshold.

6. The failure sign detection apparatus according to claim 5, further comprising a failure-determined time estimation means to estimate a time when the vehicle device fails as a failure-determined time based on a decrease rate of the device soundness factor.

7. The failure sign detection apparatus according to claim 6, wherein the vehicle device is a mechanical power output device to mechanically drive a control object mounted on the vehicle, the failure detection parameter is a value indicative of a driven amount of the control object driven by the mechanical power output device, and the abnormality detection threshold is a value indicative of a commanded driving amount of the control object commanded to the mechanical power output device.

8. The failure sign detection apparatus according to claim 1, wherein
the failure sign evaluation index calculation means is configured to calculate, for each of regular detection periods, a sum of values of the failure sign evaluation index calculated during each of the detection periods, and
the failure sign detection means is configured to detect the sign of failure of the vehicle device based on the calculated sum.

9. The failure sign detection apparatus according to claim 1, wherein the failure sign evaluation index calculation means is configured to calculate, as the failure sign evaluation index, an average of values of the parameter threshold difference calculated during the abnormality duration period excluding at least one of a maximum and a minimum of the values of the parameter threshold difference.

10. The failure sign detection apparatus according to claim 1, wherein the failure sign detection means is configured to detect the sign of failure of the vehicle device based on a sum of values of the failure sign evaluation indexes calculated for a plurality of devices mounted on the vehicle including the vehicle device.

11. The failure sign detection apparatus according to claim 1, wherein the failure sign detection means is configured to detect the sign of failure for each of a plurality of devices mounted on the vehicle including the vehicle device based on a value proportion of the failure sign evaluation index of each of the devices with respect to a sum of values of the failure sign evaluation indexes of all of the devices.

12. The failure sign detection apparatus according to claim 1, wherein the abnormality detection means is configured to change the abnormality detection threshold when a predetermined detection condition is satisfied.

13. The failure sign detection apparatus according to claim 1, further comprising a radio transmission means to radio-transmit at least one of values of the failure sign evaluation index calculated by the failure sign evaluation index calculation means and a detection result by the failure sign detection means to outside the vehicle.

14. The failure sign detection apparatus according to claim 1, further comprising a failure sign notification means to notify information identifying the vehicle device when the failure sign detection means detects the sign of failure of the vehicle device.

15. The failure sign detection apparatus according to claim 1, wherein
the vehicle device is a sensor,
the failure sign detection apparatus further comprises a plurality of tables respectively showing a relationship between an output of the sensor and a value measured by the sensor for different degrees of deterioration of the sensor, and a table selection means to select one of the tables in accordance with a value of the failure sign evaluation index when the failure sign detection means detects the sign of failure of the sensor.

16. A failure sign detection apparatus comprising:
a computer system, including a computer processor, the computer system being configured to:
make a comparison between a failure detection parameter of a vehicle device mounted on a vehicle and a predetermined abnormality detection threshold, wherein the predetermined abnormality detection threshold is set depending on a load of the vehicle by lowering a normal upper limit and raising a normal lower limit;
make a determination whether there is an abnormality in the vehicle device based on a result of the comparison:
calculate, when the abnormality in the vehicle device has been determined, an abnormality duration period over which the detected abnormality continues, and a parameter threshold difference indicative of a difference between the abnormality detection threshold and the failure detection parameter;
determine a product of the abnormality duration period and the parameter threshold difference as a failure sign evaluation index for evaluating a sign of failure of the vehicle device;
store the failure sign evaluation index in a storage memory; and
detect the sign of failure of the vehicle device based on the stored failure sign evaluation index.

17. The failure sign detection apparatus according to claim 16, wherein the computer system is further configured to calculate an average of a plurality of values of the failure sign evaluation index that are successively calculated, and determine that there is the sign of failure if the calculated average is larger than a predetermined failure sign detection threshold.

18. The failure sign detection apparatus according to claim 16, wherein the computer system is further configured to determine that there is the sign of failure upon determining that there is a tendency that the determined failure sign evaluation index increases with time.

19. The failure sign detection apparatus according to claim 16, wherein the computer system is further configured to decrease a device soundness factor indicative of a degree of soundness of the vehicle device in accordance with a value of the determined failure sign, and determine that there is the sign of failure in the vehicle device if the device soundness factor is lower than a predetermined failure sign detection threshold.

20. The failure sign detection apparatus according to claim 16, wherein the computer system is further configured to calculate, for each of regular detection periods, a sum of values of the failure sign evaluation index calculated during each of the detection periods, and detect the sign of failure of the vehicle device based on the calculated sum.

* * * * *